United States Patent [19]
Evans

[11] Patent Number: 5,786,980
[45] Date of Patent: Jul. 28, 1998

[54] ELECTRICAL COMPONENT PACKAGE AND PACKAGED ELECTRICAL COMPONENT

[75] Inventor: David A. Evans, Seekonk, Mass.

[73] Assignee: Evans Capacitor Company, Incorporated, East Providence, R.I.

[21] Appl. No.: 595,647

[22] Filed: Feb. 2, 1996

[51] Int. Cl.$^6$ .................... H01G 9/00; H01M 2/00
[52] U.S. Cl. .................... 361/502; 361/518; 361/519; 361/536; 361/537; 429/34; 429/163; 220/228; 174/17 LF; 174/17 GF
[58] Field of Search .................... 220/228; 429/34–36, 429/163–164, 174, 177; 174/17 LF, 17 GF; 361/502, 517–519, 535–537; 29/25.03

[56] References Cited

U.S. PATENT DOCUMENTS

| | | |
|---|---|---|
| 3,965,746 | 6/1976 | Rabek . |
| 4,586,108 | 4/1986 | Frick . |
| 4,992,910 | 2/1991 | Evans .................... 361/502 |
| 5,324,886 | 6/1994 | Nakatake et al. .................... 174/17 LF |
| 5,420,747 | 5/1995 | Ivanov et al. .................... 361/502 |

*Primary Examiner*—Bot L. Ledynh
*Attorney, Agent, or Firm*—Leydig, Voit & Mayer, Ltd.

[57] ABSTRACT

A packaged electrical component includes a tubular body having first and second ends and an opening at the first end for receiving an electrical component; an electrical component disposed within the tubular body; an end cap mounted on the first end of the tubular body, closing the opening; and a fluid-filled pressure-applying element disposed within the tubular body between the end cap and the electrical component, applying pressure to the electrical component within the tubular body. The fluid-filled pressure-applying element is preferably a variable volume container that contains a gas, a liquid, or a solid produced by curing of a liquid. A fluid is injected into the container after assembly of the package so that a uniform pressure is applied to the component compensating for thickness non-uniformities of the component. Assembly is simplified since the element is pressurized after assembly of the package rather than while the package is being manufactured.

21 Claims, 7 Drawing Sheets

ELECTRICAL COMPONENT PACKAGE AND PACKAGED ELECTRICAL COMPONENT

FIELD OF THE INVENTION

The present invention relates to a package for electrical components, the package containing an electrical component, and a method of making the package and, more particularly, to electrical components including laminated elements that must be compressed within the package. The invention is particularly applicable to double layer capacitors arranged in a laminated stack within a package and compressed by at least one fluid-filled pressure-applying element disposed within the package.

BACKGROUND OF THE INVENTION

It is well known in the electrical packaging arts that certain components, for example, electrolytic capacitors, electrochemical cells, batteries of electrochemical cells, and double layer capacitors, generally include within a package a stack of individual elements. The elements are generally electrically connected in series and the ends of the stack are connected to terminals on the package that may include the package body itself, pigtail leads, or similar terminals for connection to other electrical components or circuits. At least some of these stacked electrical elements function best when a compressive load is applied to the stack to ensure that the elements are held closely together.

An example of an electrical component including stacked elements that are compressed is a double layer capacitor such as described in U.S. Pat. No. 3,536,963 to Boos. In double layer capacitors as originally disclosed in that patent, the electrodes include activated carbon particles having a large surface area that is impregnated with an electrolyte. Thin current collectors are applied to opposite sides of these electrodes and held in place by elastic gaskets that are intended to seal the electrodes in order to retain the electrolyte. Since the issuance of the Boos patent, substantial improvements have been made in double layer capacitors by changing the materials employed in and the geometric arrangement of the parts of the double layer capacitor.

Double layer capacitors exhibit exceedingly large capacitances per unit volume but individual double layer capacitor cells are limited to relatively low operating voltages. In order to increase the operating voltage of the double layer capacitors, it is conventional to stack double layer capacitor cells so that the cells are connected in series, thereby increasing the operating voltage of the stack. To minimize the contact resistance between the capacitor cells in a stack and, in some cases, to improve retention of electrolyte, the stack of cells is usually placed under a compressive load.

Compression of a stack of double layer capacitor cells raises complex problems since typical manufacturing processes do not produce cells that are completely uniform in thickness. Variations in thickness dimensions within a capacitor cell result in a stack having non-parallel end surfaces. Changes in ambient temperature can produce significant changes in pressure within a stack and consequent changes in electrical characteristics.

One response to the problem of applying a consistent compressive force to a stack of double layer capacitor elements is disclosed in U.S. Pat. No. 5,420,747. As illustrated in FIG. 2 of that patent, a stack of capacitor cells is arranged between current collecting plates. Platens are applied to the current collecting plates to avoid short-circuiting and, in turn, at least two "strength plates" are applied at respective ends of the package. These strength plates are thick, heavy plates having sufficient strength to deliver 0.5 to 15 tons of pressure to the stack of capacitor cells.

The package of capacitor cells described in U.S. Pat. No. 5,420,747 is constructed by stacking the capacitor cells, applying a large external compressive force, completing package construction, and releasing the external compressive force. Upon release of the external load, the compressed capacitor cells try to relax and thereby place a tensile force on the completed package. In order to avoid undue release of the compressive force on the stack, the package must have a high modulus of elasticity, i.e., must be relatively stiff, extending relatively little in response to the tensile force applied by the stack. U.S. Pat. No. 5,420,747 describes a very stiff, heavy package including the thick strength plates and a flexible brace, i.e., a strong netting, to avoid undue release of the compressive force on the capacitor cells. According to the patent, the stiffness of the strength plates ensures application of a uniform compressive force over the entire surface of the capacitor stack.

The use of heavy strength plates as in U.S. Pat. No. 5,420,727 is undesirable for several reasons. First, the strength plates are large and heavy, adding to the weight, size, and cost of the package. Second, since it is impossible to make, at reasonable cost, the thickness of each of the capacitor cells uniform, a stack of capacitor cells typically does not have parallel end surfaces. The stiff strength plates do not compensate for these variations in the thickness of a stack so that the contact between various adjacent cells within the stack may not be uniform, resulting in increased contact resistance and reduced effectiveness of the capacitor cells in the stack. In addition, in a stack having a large cross-sectional area to provide a large capacitance, the difficulty of maintaining uniform contact between adjacent capacitor cells with stiff strength plates increases significantly. Third, assembly of the package is complicated because the assembly must take place while a substantial compressive load is continuously applied to the package.

Another structure for applying pressure to a stack of double layer capacitor elements is disclosed in my U.S. Pat. No. 4,992,910. The package shown in FIG. 1 of that patent includes an O-ring 24 made of a resilient material that is not damaged by the electrolyte or other corrosive materials that may be present within a package. The O-ring, in combination with the exterior package and a current collecting plate 22, applies a compressive force to the periphery of a stack of capacitor cells. The resilience of the O-ring can compensate for changes in ambient temperature. Moreover, that resilience can compensate, to some degree, for a cell stack having end surfaces that are not perfectly parallel due to thickness variations within the individual cells. The O-ring is lightweight and relatively inexpensive, providing numerous advantages over the strength plates of U.S. Pat. No. 5,420,747. Nevertheless, the O-ring applies a compressive force only to the periphery to the stack of capacitor cells and, therefore, does not distribute a compressive load uniformly over the cells, particularly in the central portion of the cell stack.

The foregoing discussion has been particularly directed to packages including double layer capacitor cells. However, the same problems arise in other packaged electrical components employing stacked electrochemical cells and electrolytes, such as electrical batteries.

SUMMARY OF THE INVENTION

It is an object of this invention to provide a package for an electrical component including a stack of individual cells in which a compressive force is applied uniformly to the stack of cells regardless of variations in dimensions of the cells due to manufacturing tolerances.

It is a further object of the invention to provide a lightweight and inexpensive package for an electrical component including a stack of individual cells in which a compressive force is applied uniformly to the stack of cells regardless of variations in dimensions of the cells due to manufacturing tolerances.

It is yet another object of the invention to provide a packaged electrical component including a stack of individual cells in which a compressive force is applied uniformly to the stack of cells.

It is still another object of the invention to provide a lightweight and inexpensive package for an electrical component including a stack of individual cells in which a compressive force is applied uniformly to the stack of cells.

It is a further object of this invention to provide a method for easily assembling a packaged electronic component including a stack of individual cells in which a compressive force is applied uniformly to the stack of cells.

An electrical component package according to an aspect of the invention includes a tubular body having first and second ends and an opening at the first end for receiving an electrical component, at least one end cap mountable on the first end of the tubular body for closing and sealing the opening at the first end of the tubular body, and a fluid-filled pressure-applying element disposed at the first end of the tubular body for applying pressure to an electrical component disposed in the tubular body.

Another packaged electrical component according to an aspect of the invention includes a tubular body having first and second ends and an opening at the first end for receiving an electrical component; an electrical component disposed within the tubular body; an end cap mounted on the first end of the tubular body, closing the opening; and a fluid-filled pressure-applying element disposed within the tubular body between the end cap and the electrical component, applying pressure to the electrical component within the tubular body.

A further packaged electrical component according to another aspect of the invention includes an elastomeric tubular body having first and second ends and an opening at the first end for receiving an electrical component; an electrical component disposed within the elastomeric tubular body, an end cap mounted on the first end of the tubular body, closing the opening; and a pressure-applying element disposed within the elastomeric tubular body between the end cap and the electrical component applying pressure to the electrical component within the elastomeric tubular body, the pressure-applying element comprising a variable volume container filled with a solid produced by curing of a liquid injected into the container.

One method of packaging an electrical component according to the invention includes placing within a tubular body, having an opening at a first end, an electrical component; placing a fluid-filled pressure-applying element in the tubular body on the electrical component for applying pressure to the electrical component; closing the opening by mounting an end cap on the tubular body; and increasing the pressure within the fluid-filled pressure-applying element by injecting additional fluid into the fluid-filled pressure-applying element.

Another method of packaging an electrical component according to the invention includes placing within a tubular body, having an opening at a first end, an electrical component; closing the opening at the first end of the tubular body by mounting an end cap including an end wall, a side wall, and an elastic diaphragm mounted on the end wall and forming an internal volume within the end cap, on the first end of the tubular body as a fluid-filled pressure-applying element; and injecting a fluid into the internal volume in the end cap to increase the pressure in the internal volume and to apply pressure, via the diaphragm, to the electrical component.

Still another method of packaging an electrical component according to the invention includes applying a tensile axial longitudinal force to and stretching an elastomeric tubular body having an opening at a first end; placing an electrical component within the tubular body; placing a fluid-filled pressure-applying element in the tubular body on the electrical component for applying pressure to the electrical component; closing the opening by mounting an end cap on the tubular body; and releasing the longitudinal force applied to the elastomeric tubular body.

BRIEF DESCRIPTION OF THE DRAWINGS

In all figures, like elements are given the same reference numbers.

DESCRIPTION OF PREFERRED EMBODIMENTS

Figure 1:
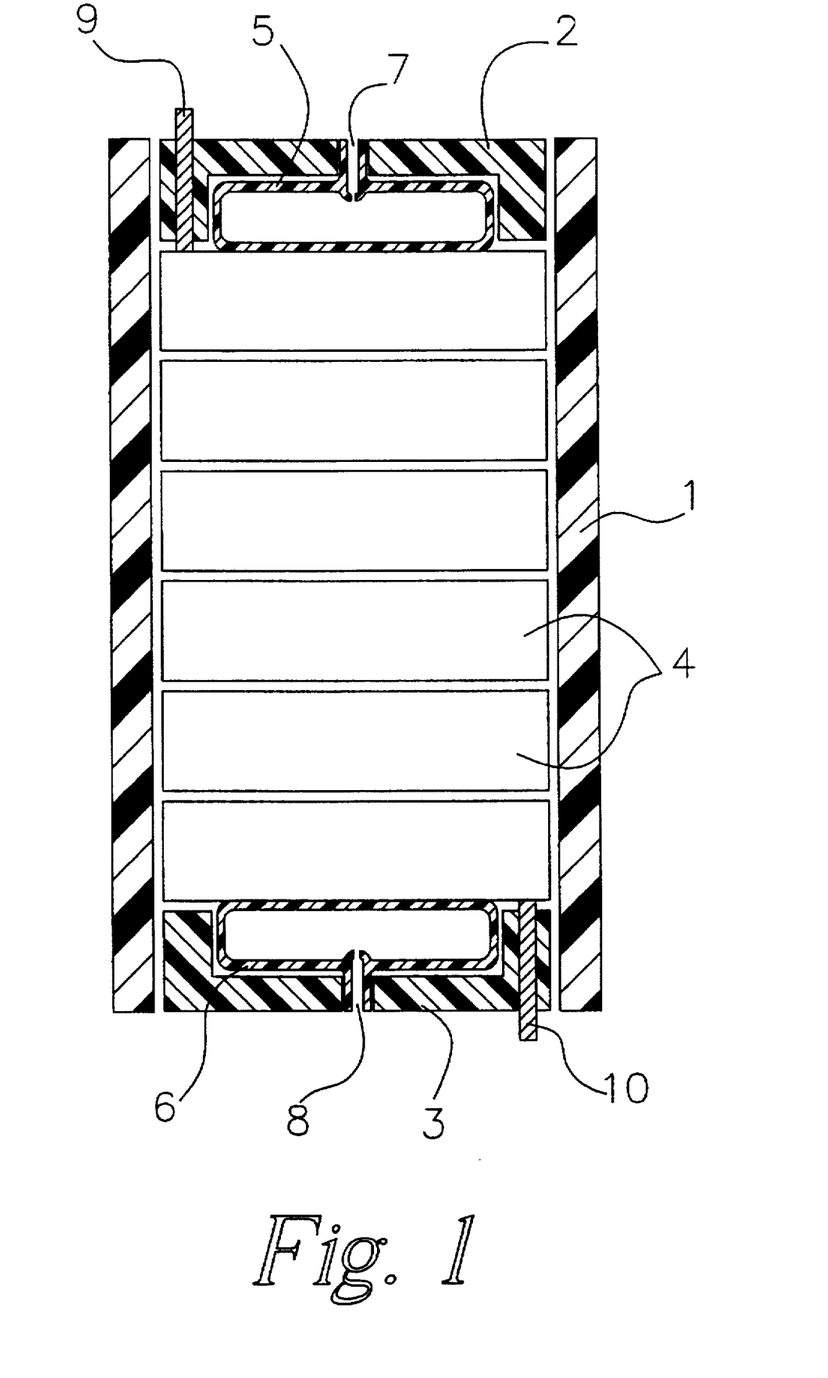
FIG. 1 is a schematic cross-sectional view of an electrical component package and a packaged electrical component according to an embodiment of the invention.
Figure 2:
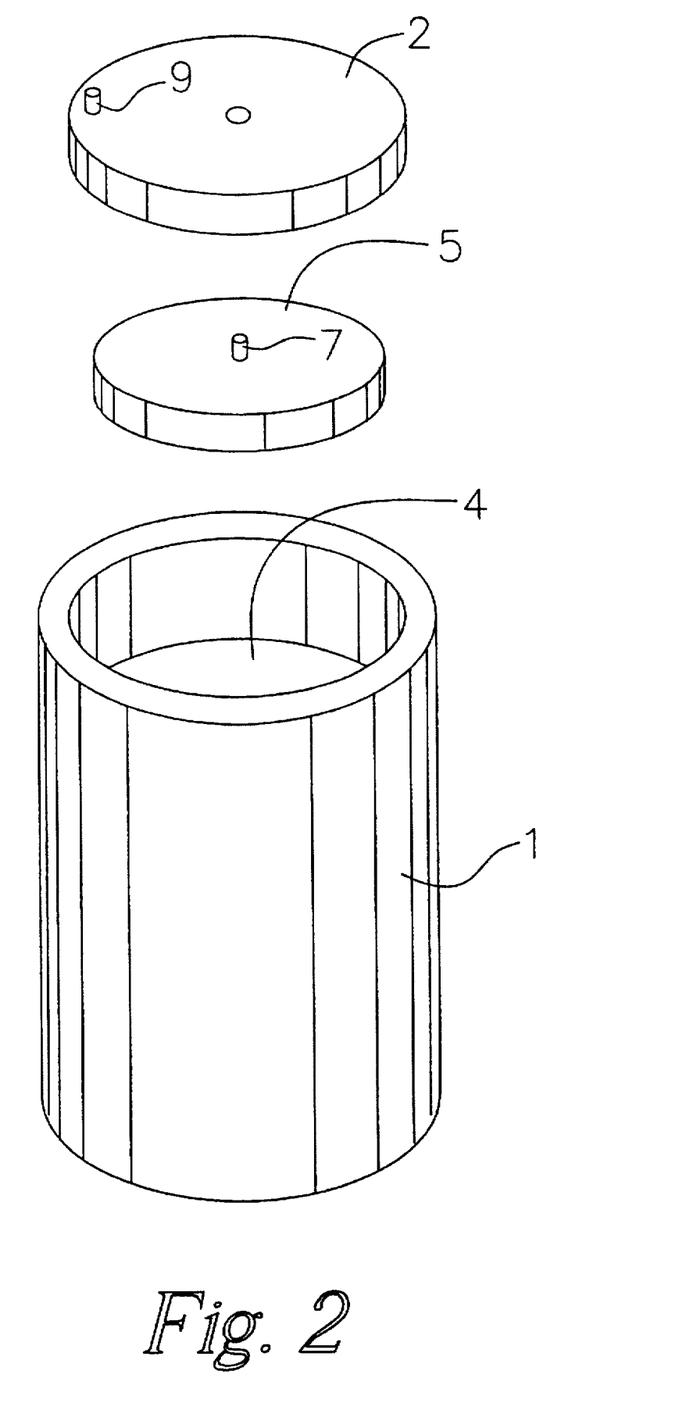
FIG. 2 is a partially exploded view of the electrical component package and packaged electrical component of FIG. 1.

FIG. 1 is a schematic cross-sectional view of an electrical component package and a packaged electrical component. FIG. 1 and the other similar figures are schematic views of packages that are tightly sealed and stacks of electrical component cells that bear against each other. In the figures, gaps appear between the cells and package for clarity of illustration. However, in a packaged electrical component according to the invention, there are no intentional gaps between adjacent cells. FIG. 2 is a partially exploded view of the packaged electrical component of FIG. 2.

The electrical component package of FIGS. 1 and 2 includes a body 1 made of an electrically insulating material having substantially the shape of a cylindrical tube. As shown in FIG. 2, the tubular body 1 has a circular cross-section. However, the invention is not limited to a package having a particular cross-sectional shape. For example, the body 1 may have a rectangular cross-section. The body 1 has opposed open ends that are closed by respective end caps 2 and 3. Contained within the package comprising the body 1 and the end caps 2 and 3 is a stack of electrical component cells 4, such as double layer capacitor cells, electrochemical cells, and the like.

A fluid-filled pressure-applying element 5 is interposed between the stack of cells 4 and the end cap 2 and a similar fluid-filled pressure-applying element 6 is interposed between the end cap 3 and the stack of cells 4. End caps 2 and 3 and pressure-applying elements 5 and 6 are, respectively, substantially identical. However, a package within the scope of the invention may include a pressure-applying element and associated end cap at only one end of the package without any fluid-filled pressure-applying element at the other end. As an alternative, one end of the package from the fluid-filled pressure applying element may be a closed end that is planar or may be an inwardly directed domed end, such as commonly used in aerosol cans, for applying pressure, i.e., transmitting a tensile force of the package body, to the stack of cells. This end cap, regardless of shape, may be unitary with the body, i.e., the body and end cap may be a single continuous piece of material. A fluid-filled pressure-applying element may be inserted between the electrical component and the unitary end cap and is preferably present when the end cap is an inwardly directed dome.

Each of the fluid-filled pressure-applying elements 5 and 6 includes a closed, variable volume, container. The container may be made of a resilient material, such as a natural or synthetic rubber, polyvinyl chloride (PVC), or polyurethane, or may be metal and include an expansion element such as a bellows. Each pressure-applying element may include a check valve, such as the check valves 7 and 8 shown in FIG. 1, that is self-sealing but that allows injection of a compressible fluid, such as a gas, into the pressure-applying element. Alternatively, the containers, if a polymer or a plastic material, may be self-sealing, so that no valve is needed. End caps 2 and 3 respectively include electrical feedthroughs 9 and 10 that make contact to opposite ends of the stack of component cells 4 and provide external electrical connections to that stack. In order to achieve the best electrical connection between the feedthroughs 9 and 10 and the respective ends of the stack of electrical component cells 4, electrically conducting current collection plates, such as metal foils, not shown in FIG. 1, may be interposed between the electrical component cells at the ends of the stacks and the respective end caps 2 and 3. The end caps also include central openings, providing access to the pressure-applying elements 5 and 6, and, if present, the valves 7 and 8.

The packaged electrical component of FIG. 1 is easily assembled. Preferably, the end caps 2 and 3 are made of the same or a similar material as the body 1, for example, a rigid plastic that is easily joined to itself with an appropriate adhesive. Exemplary materials include PVC, polyethylene, polypropylene, acrylonitrile-butadiene-styrene copolymer (ABS), and like plastics. The end caps 2 and 3 and the body 1 could also be made of a metal and the package closed by crimping, soldering, or welding.

In a preferred assembly process, one of the end caps, such as end cap 3, is installed in the body 1 and attached to the body by adhering, crimping, soldering, welding, or an appropriate technique depending upon the materials employed. Thereafter, the fluid-filled pressure-applying element 6 and the stack of cells 4 are inserted through the other opening of the body 1, followed by insertion of the fluid-filled pressure-applying element 5 and similar attachment of the end cap 2 to the body 1. (Although not illustrated in the figures, an inert encapsulant is frequently injected into the package before the completion of assembly to fill any void space that may be present.) Thereafter, a compressible fluid, such as an inexpensive gas, for example, air or nitrogen, is injected into each of the pressure-applying elements at an appropriate pressure. If the containers 5 and 6 are self sealing, the fluid may be injected with a syringe and a needle that is inserted into the container through the hole in the end cap. To aid in closing the container and maintaining a good seal, after pressurization of the container, the hole in the end cap may be filled with an adhesive, such as an epoxy, including a foamed adhesive. When a check valve is present, a similar process may be used to pressurize the fluid-filled pressure-applying element. The variable volume containers 5 and 6 thus apply pressure over a very large proportion of the area of the stack of electrical component cells 4 to achieve the desired compression of that stack and ensure proper operation.

The invention as exemplified by the embodiment illustrated in FIG. 1 provides numerous advantages over the prior art. First, the pressure-applying elements are small and lightweight as well as being low in cost. Even the check valves, if present, are conventionally available at low cost because they are employed in conventionally available articles, such as balls used in sports activities. Second, the compression of the stack can be adjusted by changing the pressure within each of the containers of the fluid-filled pressure-applying elements. Third, the pressure applied to the stack compensates for dimensional variations in the thicknesses of the respective electrical component cells, temperature variations, and other dimensional variations and changes within the package. The flexibility and resilience of the containers and the fluid within them fill the available space, thus compensating for dimensional variations within the cells and package.

A particular advantage achieved in the invention is significantly simplified assembly of the package. With the invention as exemplified by the embodiment of FIG. 1, there is no preloading of the stack of cells with a compressive force that must be maintained during assembly so that the package can be easily assembled without the stack of cells being kept under a compressive load. Rather, it is only after the mechanical assembly is complete that the compressive loading of the stack of cells (and tensile loading of the body 1) takes place with the pressurizing of the fluid-filled pressure-applying elements.

In packages according to the invention, a relatively large deformation of the stack of cells may have a relatively small effect on the compressive pressure applied to the stack. For example, after assembly, the pressure-applying elements are pressurized at ten atmospheres, the initial compressive pressure on the stack is about one-hundred fifty pounds per square inch. Assuming that the dimension of each variable volume container, so inflated, along the central longitudinal axis of the package is about 0.375 inch, the total initial "spring" length is 0.75 inch. If the cell stack deforms by as much as 0.050 inch, the change in the compressive pressure is only about seven percent, i.e., about ten pounds per square inch, an acceptable variation in compression that does not adversely affect the electrical properties of the packaged electrical component when the cells are double layer capacitors.

The foregoing analysis demonstrates that manufacturing tolerances in producing packaged electrical components according to the invention can be less rigid than with prior art structures, resulting in lower cost. The foregoing example also demonstrates that dimensional variations in the thicknesses of the cells can be easily accommodated in a package according to the invention. In other words, if the two end surfaces of the cell stack are not exactly parallel, the variable volume containers of the pressure-applying elements, particularly if they are resilient bladders, will locally vary in the amount of their deformation, compensating for these dimensional variations. That compensation is a significant improvement over the use of very stiff, massive spring elements that attempt to overcome dimensional variations by applying large forces.

As a further advantage of the invention, it has been found that use of resilient, large area, fluid-filled pressure-applying elements permits a reduction in the load applied in compressing the stack of electrical component cells 4 without a sacrifice in electrical performance. The amount of pressure to be applied depends upon the area of the package. For example, in a prior art structure including electrodes having an area of twenty-five square inches to which a compressive load of one-hundred fifty pounds per square inch is applied, to avoid a deflection greater than 0.01 inch at the center of a plastic end plate, the end plate must be one inch thick. Because of the reduction in pressure that can be achieved using the invention, the required load is only seventy-pounds per square inch so that the end plate, when made of the same plastic, can be about one-quarter inch thick without undue deflection. In the invention, unlike the prior art, deflection of an end wall into a non-planar shape is not unacceptable. In the invention the fluid-filled pressure-applying elements evenly distribute the compressive load regardless of the deflected shape of the end wall. In the prior art, even loading of the cell stack is achieved only if the end wall deflection is minimal.

Figure 3:
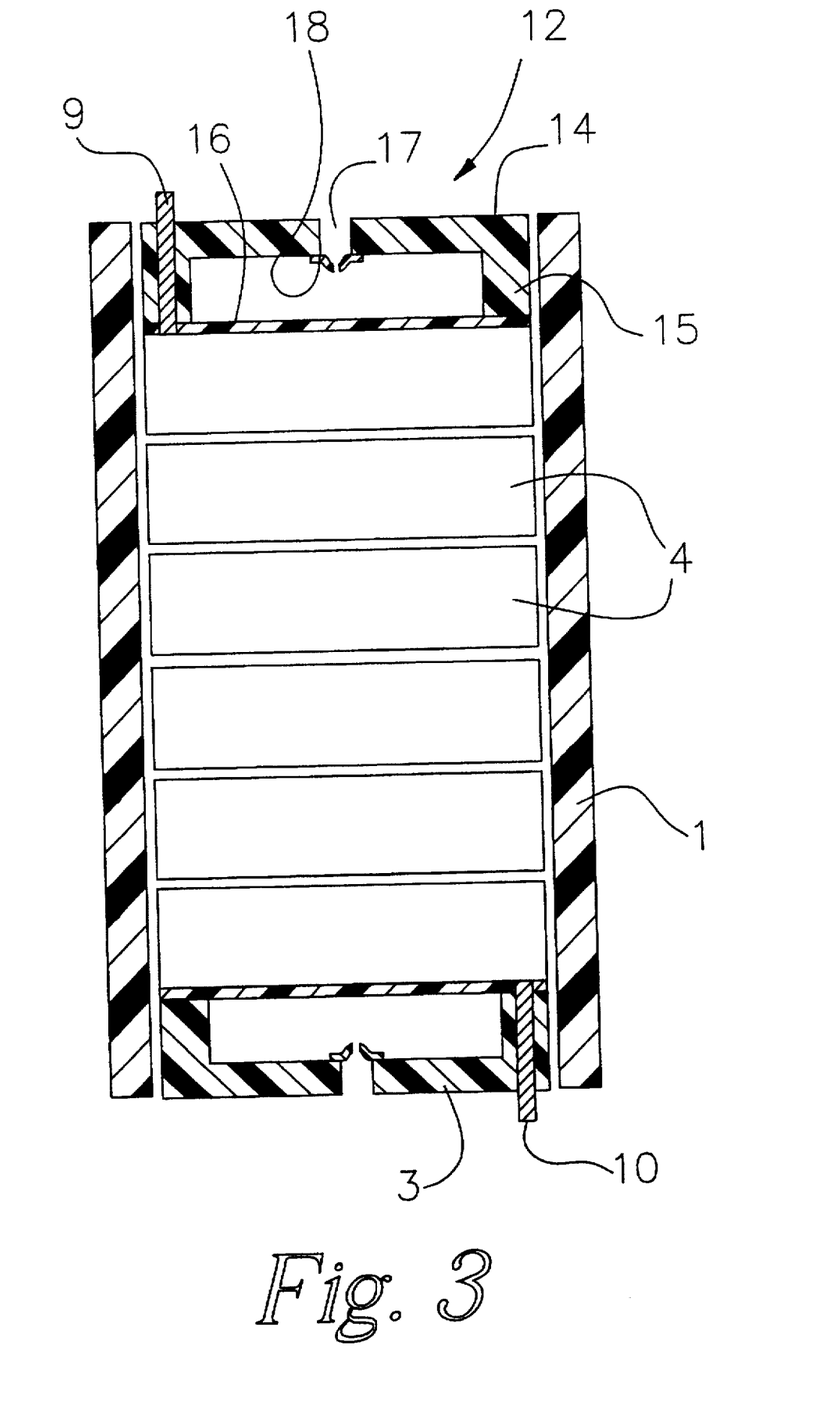
FIG. 3 is a schematic cross-sectional view of an electrical component package and a packaged electrical component according to an embodiment of the invention.
Figure 4:
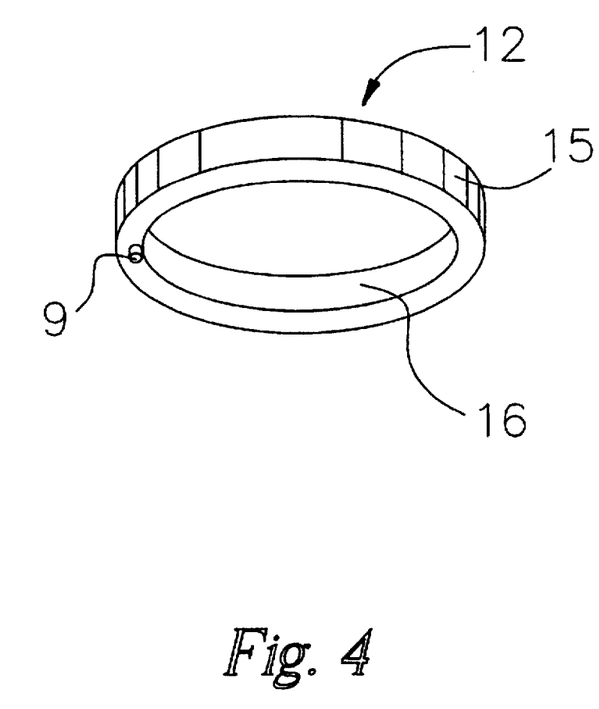
FIG. 4 is a perspective view of an end cap of the embodiment of FIG. 3.

FIGS. 3 and 4 depict an alternative electrical component package including the same body 1 having openings at opposite ends. However, the structure of end caps 12 and 13 that close the ends of the body 1 is different from the structure of the end caps 2 and 3 described with respect to FIGS. 1 and 2. The end caps 12 and 13 are substantially identical to each other so that only one of them needs to be described. The electrically insulating end cap 12 includes an end wall 14 and a side wall 15 extending peripherally from the end wall. In cross-section, the end cap 12 has a C-shape similar to the end cap 2. A resilient membrane 16 is attached to the open end of the side wall 5 of the end cap 12, defining an internal volume within the end cap. The membrane 16 may be made of the same resilient materials that can be used as a bladder in an embodiment of the pressure-applying element shown in FIG. 1. End cap 12 also includes a central opening 17 that may be closed by a check valve 18 mounted on the end wall 14 of the cap or by a self-sealing membrane. Although the check valve 18 as shown in FIG. 3 is mounted on the inside of the end cap 12, external mounting is also possible.

The electrical component package of FIG. 3 is assembled in the same manner that the package of FIG. 1 is assembled. However, there is no separate fluid-filled pressure-applying element. Instead, the internal volume inside the end cap defined by the membrane 16 functions as the pressure-applying element. After mechanical assembly of the end caps and the body with the stack of cells inside the package, a compressible fluid, such as air or nitrogen, is injected into the internal volume of the end cap 12 to a desired pressure, distending the membrane 16 and compressing the stack of electrical component cells 4. The internal volume of the end cap 13 is likewise pressurized. The electrical feedthrough 19 of end cap 12, like the feedthrough 22 of end cap 13, extends through or at the edge of the membrane 16 to make electrical contact with one end of the stack of electrical component cells, either directly or through a current-collecting foil or plate that, for clarity, is not illustrated in FIG. 3. The same advantages achieved with the package of FIG. 1 are also achieved in this embodiment of the invention.

Although the embodiments of FIGS. 1 and 3 include a series electrical connector between cells, series-parallel electrical interconnections of cells can also be employed. In that arrangement, cells are connected in parallel by electrical bus bars (not shown) that extend along the edges of the cells, electrically connecting some or all of the cells in parallel. Adjacent individual cells electrically connected in parallel have electrically insulating separators between them. Groups of cells connected in parallel may be connected in series through other bus bars and/or by direct contact of cells within the stacked arrangement.

In the embodiments of FIGS. 1 and 3, the end caps are internally received within the body 1, an arrangement that provides a package with a smooth external surface. However, at least with the embodiment of FIG. 1, the end cap may have an internal dimension or dimensions that are essentially the same as the external dimensions of the body 1. In that case, the end cap surrounds the body 1 rather than vice versa. In that arrangement, the pressure-applying element can extend over essentially the entire area of the end surface of the stack of electrical component cells, making even more uniform the compressive force applied to the stack. In that structure, a somewhat different arrangement from FIG. 1 must be made to ensure that the electrical feedthroughs reliably contact the respective ends of the cell stack.

Figure 5:
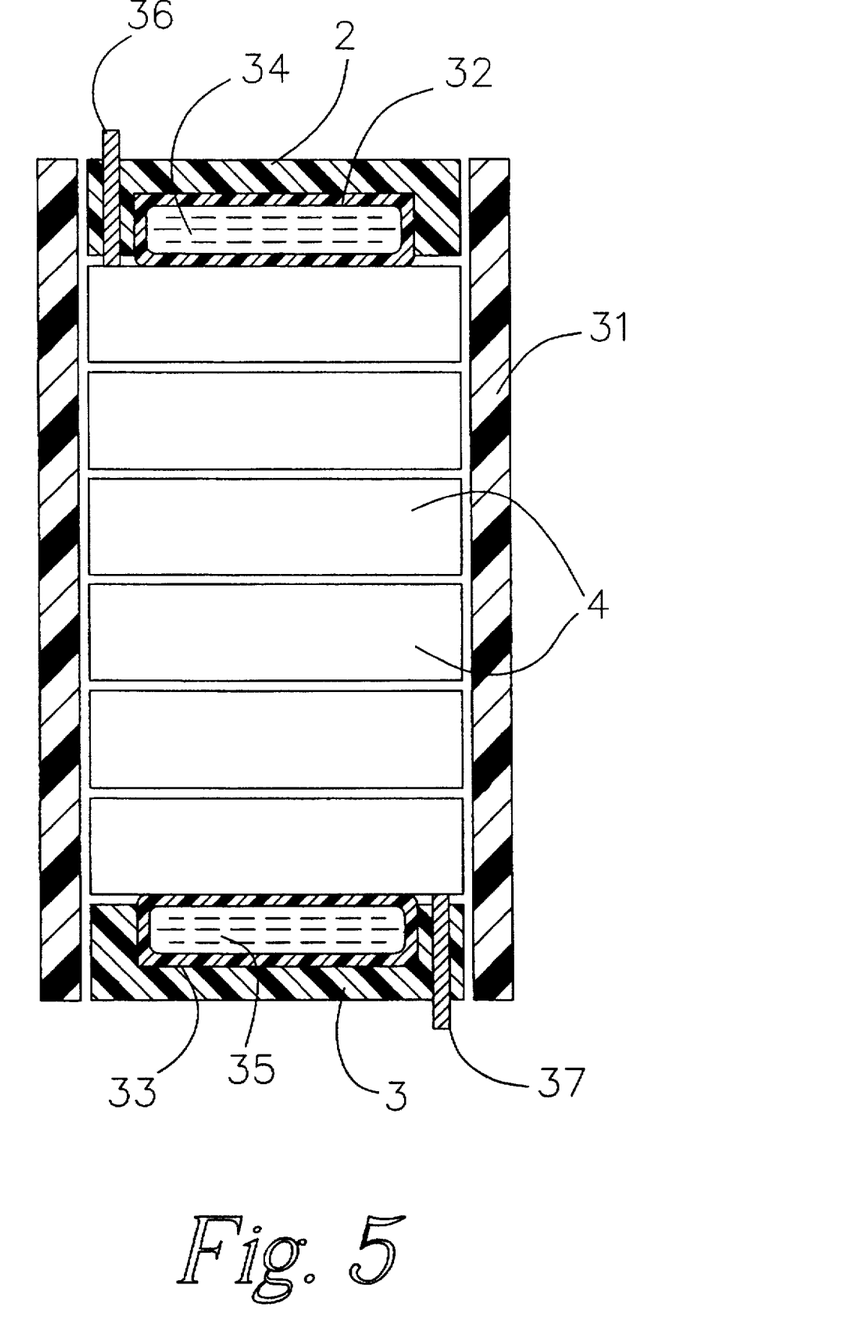
FIG. 5 is a schematic cross-sectional view of an electrical component package and a packaged electrical component according to an embodiment of the invention.

FIG. 5 shows another embodiment of an electrical component package and packaged electrical component according to an embodiment of the invention. This embodiment includes a body 31 open at opposite ends that is made from an elastomeric material. The body 31 may be any readily available elastomeric material that is compatible with the electrolytic or other contents of the completed package, such as natural or synthetic rubbers. The body, containing the stack of electrical component cells 4, is sealed at opposite ends by the end caps 2 and 3. Those end caps, at least to the extent of their electrically insulating walls, are identical to the end caps of FIG. 1. However, the fluid-filled pressure-applying element in each of the end caps is significantly different from the structure of FIG. 1. Within each of end caps 2 and 3 are disposed fluid-filled pressure-applying elements 32 and 33, respectively, each including a variable volume container, just like the fluid-filled pressure-applying elements 5 and 6 of FIG. 1. However, the variable volume containers of the pressure-applying elements 32 and 33 are filled with a non-compressible material 34 and 35, respectively, that may be a liquid such as water or, more preferably, an organic material such as an oil, for example, a silicone oil, or a solid such as an uncured epoxy that distributes a compressive load by conforming to dimensional irregularities in the electrical component. Upon curing, the epoxy applies pressure continuously. Electrical feedthroughs 36 and 37 provide electrical contacts to opposite ends of the stack of electrical component cells 4. In this structure, the elastomeric body 31 is in tension so that it pulls the end caps 2 and 3 toward each other. The resulting force is applied, through the material within the pressure-applying elements 32 and 33, to the stack of cells 4. This structure has the same advantages as the other embodiments of the invention are achieved.

The preferred method of assembling the packaged electrical component including the elastomeric body 31 is the same process described for other embodiments not employing an elastomeric body. After closing of the elastomeric body 31 by attaching the ends caps 2 and 3, an incompressible liquid, such as water, silicone oil, or an uncured polymer, e.g., epoxy, is injected into the pressure-applying elements 32 and 33. The increasing pressure causes the elastomeric body 31 to elongate, ensuring that a compressive load is applied to the stack of cells 4. When an uncured epoxy is injected as the pressure-applying material, it ultimately cures and takes a fixed shape. While liquid, the polymer functions in the same way as liquids that remain liquid by distributing a compressive load over the entire stack of cells 4 regardless of dimensional variations in the cells. When a polymer, such as an epoxy, is used as the fluid, until the polymer cures and becomes a solid, there is essentially no difference in this embodiment and other embodiments described above with the exception of the use of an elastomeric material as the body that assists in applying a compressive load to the stack of cells. In other words, even when a material that becomes a solid is employed to apply pressure to the stack of cells, since the material is injected as liquid, fluid-filled pressure-applying elements are present at least temporarily and the method of manufacturing the packaged electrical component is, in essence, identical to the methods described above except that the fluid injected is not a gas but is a liquid.

When a liquid is employed as the pressure-applying medium and that liquid cures into a solid form, there is, advantageously, no probability of leakage of the pressure-applying medium. However, the setting of the pressure-applying medium into a solid means that there can be no compensation for further changes in dimensions of the cells after assembly. Likewise, although the packaged electrical component employing the elastomeric body 31 is described in greatest detail with respect to using a liquid as the pressure-applying medium, an elastomeric body may also be used in a structure including fluid-filled pressure-applying elements that are filled with a gas. The use of a compressible fluid, such as a gas, in that case, supplements the compressive force applied by the elastomeric body that is, itself, in tension.

Figures 6A, 6B:
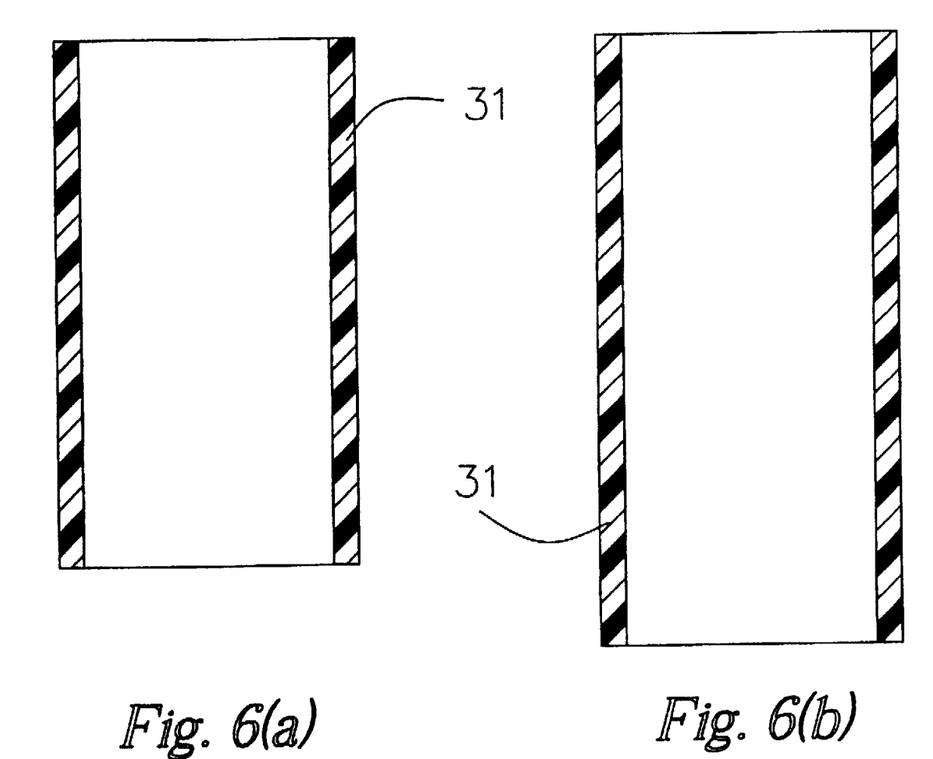
FIGS. 6(a)–6(e) illustrate a method of assembling a packaged electrical component according to the invention.
Figure 6C:
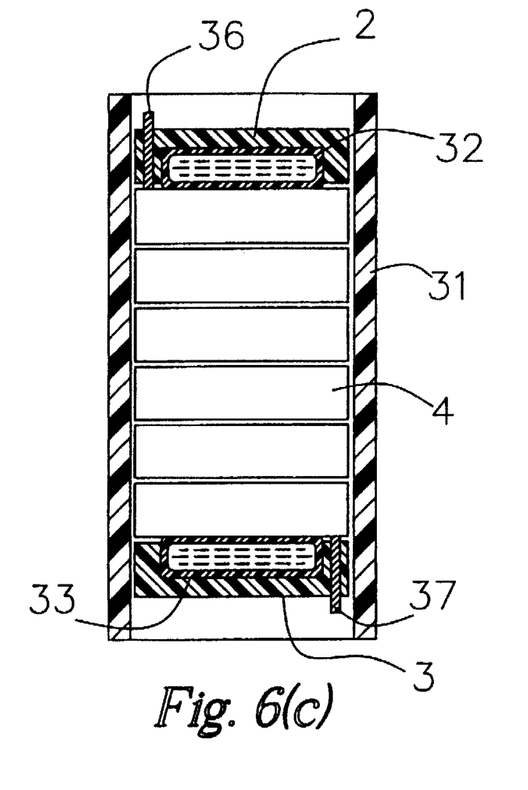

Another assembly process for the embodiment of FIG. 5 is illustrated in FIGS. 6(a)–6(e). Initially, as illustrated in FIG. 6(a), the body 31 of an elastomeric material is prepared. Preferably, in this method, the length of the body is initially longer than the completed structure. As shown in FIG. 6(b), the body 31 is elongated along a central longitudinal axis in order to tension the elastomeric material. While that tensile force is still being applied, as illustrated in FIG. 6(c), the stack of electrical component cells 4 is placed inside the body 31 and the end caps 2 and 3, including the pressure-applying elements 32 and 33 filled with any of the non-compressible fluids already described, are placed inside the body 31 and adhered to it.

Figure 6D:
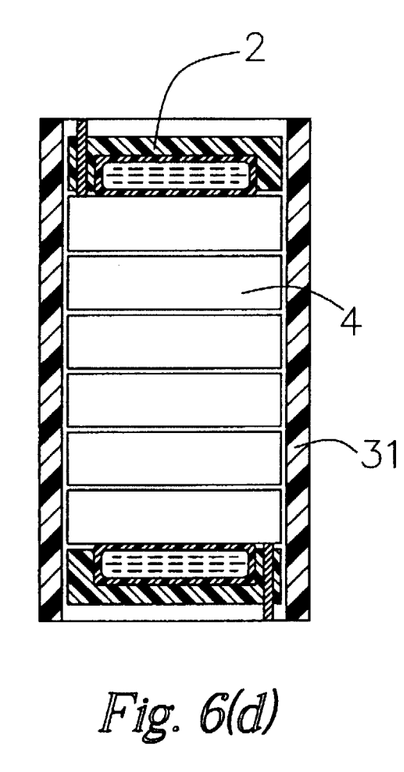
Figure 6E:
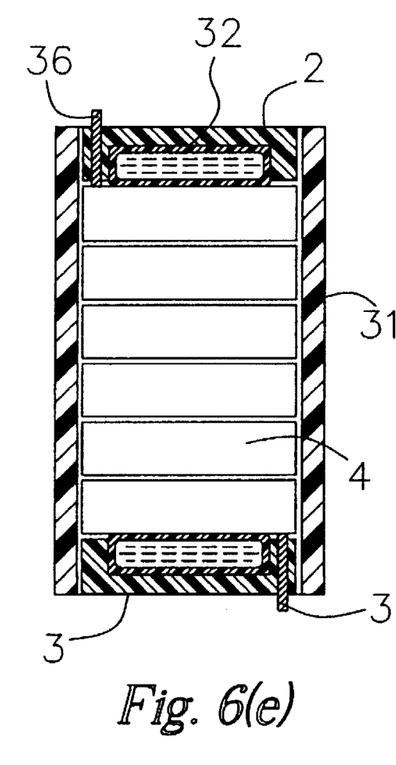

As shown in FIG. 6(d), after completion of the assembly of the end caps 2 and 3 and the body 31, the tensile force on the body 21 is released. Since the elastomeric body 31 cannot completely return to its original length, it retains a tensile force that is continuously applied to the stack of electrical component cells 4 through the pressure-applying elements to compress that stack. Finally, as illustrated in FIG. 6(e), the excess length of the body 31 is removed, producing the structure of FIG. 5. As in other embodiments, the cells may be electrically connected in series or series-parallel to increase voltage handling capacity and/or capacitance.

The invention has been described with respect to certain preferred embodiments. Various additions and modifications within the spirit of the invention will occur to those of skill in the art. Accordingly, the scope of the invention is limited solely by the following claims.

I claim:

1. A package for an electrical component comprising:
   a tubular body having first and second ends and an opening at the first end for receiving an electrical component;
   at least one end cap mountable on the first end of the tubular body for closing and sealing the opening at the first end of the tubular body; and
   a closed, variable volume, fluid-filled pressure-applying element disposed within the tubular body at the first end of the tubular body for applying pressure to an electrical component disposed within the tubular body.

2. The package of claim 1 wherein the tubular body includes a second opening at the second end, and including a second end cap mountable on the second end of the tubular body, and a second closed, variable volume, fluid-filled pressure-applying element disposed within the tubular body at the second end of the tubular body.

3. The package of claim 1 wherein the closed, variable volume, fluid-filled pressure-applying element is filled with a gas.

4. The package of claim 1 wherein the closed, variable volume, fluid-filled pressure-applying element is filled with a liquid.

5. The package of claim 1 wherein the tubular body is an elastomeric material.

6. A package for an electrical component comprising:
   a tubular body having first and second ends and an opening at the first end for receiving an electrical component; and
   a fluid-filled end cap for applying pressure to an electrical component disposed within the tubular body, the end cap including an end wall, a side wall transverse to the end wall, and an elastic membrane mounted on the side wall and forming an internal volume within the end cap, the end cap being mountable on the first end of the tubular body for closing and sealing the opening at the first end of the tubular body.

7. The package of claim 6 wherein the end cap includes an aperture for injecting a fluid into the internal volume.

8. A packaged electrolytic capacitor comprising:
   a tubular body having first and second ends and an opening at the first end for receiving an electrical component;
   an electrolytic capacitor disposed within the tubular body;
   an end cap mounted on the first end of the tubular body, closing the opening; and
   a fluid-filled pressure-applying element disposed within the tubular body between the end cap and the electrolytic capacitor, applying pressure to the electrolytic capacitor within the tubular body.

9. The packaged electrolytic capacitor of claim 8 wherein the tubular body includes an opening at the second end, and including a second end cap mounted on the second end of the tubular body, closing the opening at the second end, and a second fluid-filled pressure-applying element disposed within the tubular body between the second end cap and the electrolytic capacitor, applying pressure to the electrolytic capacitor within the tubular body.

10. The packaged electrolytic capacitor of claim 8 wherein the electrolytic capacitor is a double layer capacitor.

11. The packaged electrolytic capacitor of claim 8 wherein the tubular body is an elastomeric material.

12. The packaged electrolytic capacitor of claim 11 wherein the fluid-filled pressure-applying element is an elastic bladder filled with a liquid.

13. A packaged electrical component comprising:
   a tubular body having first and second ends and an opening at the first end for receiving an electrical component;
   an electrical component disposed within the tubular body;

an end cap mounted on the first end of the tubular body, closing the opening; and a closed, variable volume, fluid-filled pressure-applying element disposed within the tubular body between the end cap and the electrical component, applying pressure to the electrical component within the tubular body.

14. The packaged electrical component of claim 13 wherein the closed, variable volume, fluid-filled pressure-applying element is filled with a liquid.

15. The packaged electrical component of claim 14 wherein the tubular body is an elastomeric material.

16. The packaged electrical component of claim 13 wherein the closed, variable volume, fluid-filled pressure-applying element is filled with a gas.

17. A packaged electrical component comprising:

a tubular body having first and second ends and an opening at the first end for receiving an electrical component;

an electrical component disposed within the tubular body; and a fluid-filled end cap applying pressure to the electrical component within the tubular body, the end cap including an end wall, a side wall transverse to the end wall, and an elastic membrane mounted on the side wall and forming an internal volume within the end cap, the end cap being mounted on the first end of the tubular body, closing and sealing the opening.

18. The packaged electrical component of claim 17 wherein the end cap includes an aperture and a valve for injecting a fluid into the internal volume.

19. A packaged electrical component comprising:

an elastomeric tubular body having first and second ends and an opening at the first end for receiving an electrical component;

an electrical component disposed within the elastomeric tubular body;

an end cap mounted on the first end of the elastomeric tubular body, closing the opening; and a pressure-applying element disposed within the elastomeric tubular body between the end cap and the electrical component, applying pressure to the electrical component with in the elastomeric tubular body, the pressure-applying element comprising a variable volume container filled with a solid produced by curing of a liquid injected into the container.

20. The packaged electrical component of claim 19 wherein the solid is a cured epoxy.

21. The packaged electrical component of claim 19 wherein the end cap includes an end wall and a side wall transverse to the end wall and an elastic membrane mounted on the side wall forming an internal volume within the end cap filled with the solid pressure-applying material.

* * * * *